United States Patent [19]

Einhorn

[11] 3,974,557

[45] Aug. 17, 1976

[54] METHOD OF MAKING HARD WALL FASTENER

[75] Inventor: Rüediger Einhorn, Katonah, N.Y.

[73] Assignee: Coats & Clark, Inc., Stamford, Conn.

[22] Filed: Mar. 6, 1975

[21] Appl. No.: 555,737

[52] U.S. Cl............................. 29/418; 29/527.6; 29/DIG. 10; 164/98; 164/112; 248/216
[51] Int. Cl.² ....................................... B23P 17/00
[58] Field of Search....................... 164/98, 112, 76; 29/527.6, 418, 527.5, DIG. 10; 248/216, 217, 218, 220, 220.5, 219

[56] References Cited
UNITED STATES PATENTS

| 1,494,103 | 5/1924 | De Cardy................ 29/DIG. 10 |
| 2,151,292 | 3/1939 | Brickman et al. ........... 29/527.6 X |
| 2,529,348 | 11/1950 | Mustee ..................... 29/527.6 |
| 3,300,173 | 1/1967 | Kennedy, Jr................. 248/217 X |
| 3,599,314 | 8/1971 | Harrison .................... 29/418 |

FOREIGN PATENTS OR APPLICATIONS 538,066   3/1957   Canada............................. 29/527.5

Primary Examiner—Victor A. DiPalma
Attorney, Agent, or Firm—Burgess Ryan and Wayne

[57] ABSTRACT

A fastener adapted to be affixed to a hard wall, such as a concrete wall, has a base through which at least one hole extends. A bushing is releasably held in the hole at one end thereof, and extends outwardly, and a pointed pin is held in the center hole of the bushing. The bushing guides the pin into the wall, upon impact. The hole in the base and the bushing may be provided with flanges to inhibit their relative separation. A hinged cover may be provided on the base, to cover the bushings and pins when the fastener is affixed to a wall. In one method for making the fastener, a plurality of bushings are die cast with interconnecting gates, and the interconnected bushings are employed to serve as part of the die for die casting the base, whereby the gates become imbedded in the base to form a frangible means for holding the bushings in the base.

22 Claims, 17 Drawing Figures

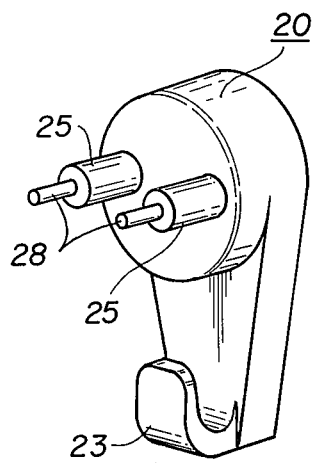
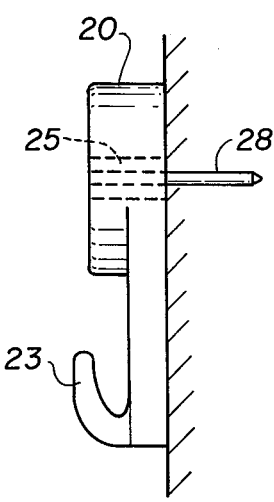
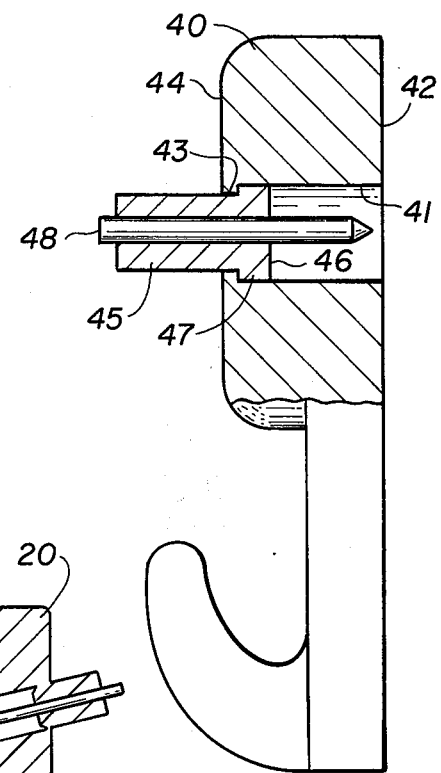
FIG.1  FIG.2  FIG.6
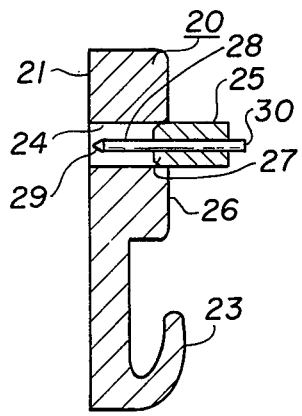
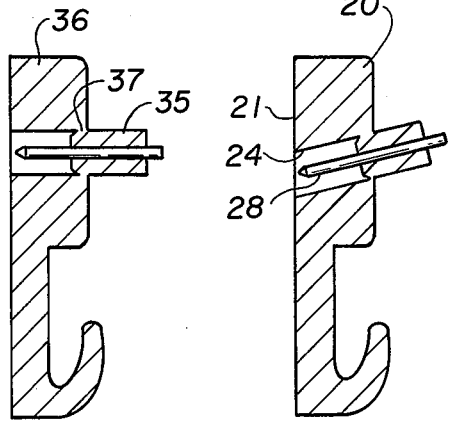
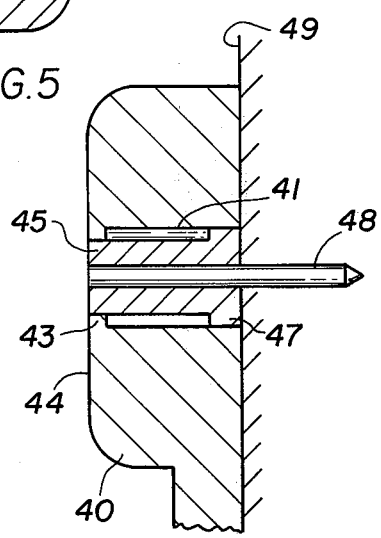
FIG.3  FIG.4  FIG.5  FIG.7
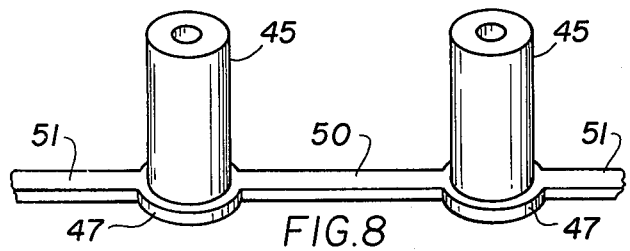
FIG.8
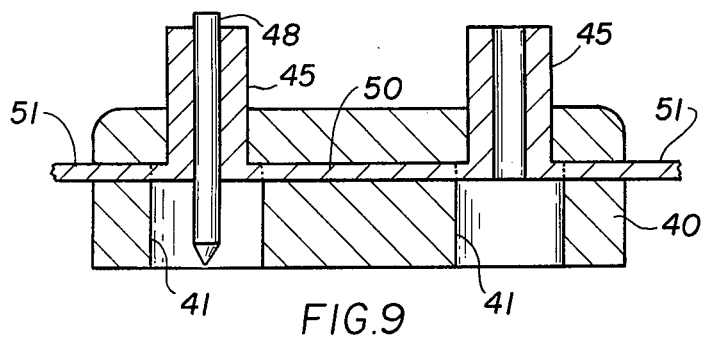
FIG.9

METHOD OF MAKING HARD WALL FASTENER

BACKGROUND OF THE INVENTION

This invention relates to a fastening device, and is particularly directed to the provision of a fastening device of the type adapted to be affixed to a wall, for example, for suspending an object therefrom.

In the past, many wall fasteners have been provided for hanging objects, such as pictures, from a wall. Fasteners of this type usually are provided with one or more pins or nails adapted to be driven into the wall, with a hook or other hanging device affixed to the pins or nails. Such fastening devices may be suitable for suspending objects from walls that are relatively soft, such as wood walls, but they are not readily adapted to supporting objects on hard walls, such as concrete walls and other masonry walls.

U.S. Pat. No. 3,232,572, Ekstrom, discloses a fastener adapted to be affixed to a concrete wall, in which a plurality of pins are provided extending into holes in an elastic-yielding plastic base. In this arrangement, when the pins are hammered into a wall, by way of the base, they are deformed in the concrete, the deformation of the pins and the elastic nature of the base serving to hold the fastener to the wall.

SUMMARY OF THE INVENTION

In accordance with the invention, it has been found desirable to employ pins, in a hard wall fastener, that are sufficiently hard that they will not be deformed upon being driven into a wall. Pins of such hardness may be driven deeper into a hard wall, due to the absence of deformation, whereby a fastener may be adequately affixed to a wall even though only a single pin is employed. In the arrangement of the Ekstrom patent, as above discussed, two or more pins must be employed to adequately secure the fastener to a wall, since the holding action occurs at least in part due to the deformation of the multiple pins.

In accordance with the invention, it has been found that, in order to satisfactorily employ a hard pin in a fastener, for use on a hard wall, means must be provided for reliably guiding the pin as it is driven into a wall. In order to effect the guiding of the pin, the present invention provides a base member having a hole extending therethrough from the mounting surface, and a bushing is mounted in the end of the hole away from the mounting surface. A hardened pin is assembled in the hole in the bushing, so that the bushing guides the pin into the wall, and the hole in the base guides the bushing. The arrangement thus enables the use of a pin of relatively small diameter, which may be readily driven into a wall, but which cannot adequately be guided by a simple hole extending through the base. The arrangement in accordance with the invention, prevents the collapse of a pin having a small diameter, even though the pin is hit off axis by the hammer. Further, in the arrangement of the invention, a smaller force is required for forcing the pin into the wall, and deeper penetration of the pin is possible.

The bushing may be formed separately from the base, and later assembled therein, or the bushing and base assembly may be formed by die casting, with the first-formed of these members serving as the die for the second-formed of these members. Alternatively, the bushing and base may be formed as a single unitary die casting, with a thin frangible interconnection of the common material serving to hold these elements together. In a particularly advantageous method in accordance with the invention, a plurality of bushings are die cast with gates interconnecting them at one end. This combined structure then serves as a part of the die for casting of the base member, whereby the gate portions become imbedded in the base, and serve as frangible members for holding the bushings in the desired position in the holes in the base.

In a further embodiment of the invention, the holes in the base may be provided with internal flanges at their ends away from the mounting surface, and the bushings may be provided with outwardly extending flanges at their ends within the holes of the base, in order to more firmly and reliably hold the bushings in the base. Further, a hinged cover may be provided on the base, so that the ends of the pins and bushings may be concealed after the fastener has been affixed to a wall.

The base and bushings are preferably formed of a die casting material, whereby the elements of the fastener may be formed to have any desirable ornamental appearance.

In order that the invention will be more clearly understood, it will now be disclosed in greater detail with reference to the drawings, wherein:

BRIEF DESCRIPTION OF THE DRAWINGS

FIG. 1 is a perspective view of one embodiment of a hard-wall fastener in accordance with the invention;

FIG. 2 is a side view of the hard-wall fastener of FIG. 1, illustrated fixed to a wall;

FIG. 3 is a cross-sectional view of the hard-wall fastener of FIG. 1, prior to assembly on a wall;

FIG. 4 is a cross-sectional view of a modification of the hard-wall fastener of FIG. 1;

FIG. 5 is a cross-sectional view of a further modification of the hard-wall fastener of FIG. 1, wherein the pins extend through the base member at an angle;

FIG. 6 is an enlarged partially cross-sectional view of a still further modification of the hard-wall fastener of FIG. 1;

FIG. 7 is a cross-sectional view of a portion of the hard-wall fastener of FIG. 6, illustrated affixed to a wall;

FIG. 8 is a perspective view of a plurality of bushings cast with an interconnecting gate, which may be employed in the formation of a hard-wall fastener in accordance with the invention;

FIG. 9 is a cross-sectional view of a hard-wall fastener incorporating the bushings of FIG. 8, at a second stage in the formation of a hard-wall fastener in accordance with the invention;

DESCRIPTION OF THE PREFERRED EMBODIMENTS

Figure 10:
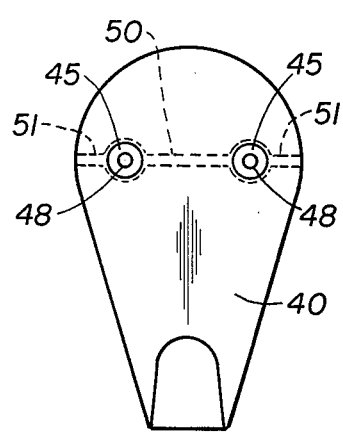
FIG. 10 is a simplified plan view of a hard-wall fastener in accordance with the invention, incorporating two pins.

Referring now to the drawings, and more in particular, to FIGS. 1 – 3, therein is illustrated a hard wall fastener in accordance with one embodiment of the invention. The hard wall fastener is comprised of a body or base member 20 having a surface 21 shaped to engage a wall, such as the wall 32 illustrated in FIG. 2. The surface 21 is thus generally, although not necessarily, flat. In order to enable an object to be suspended by means of the fastener, the base 20 may be formed with a hook 23 or similar projection. It will be understood, of course, that the invention is not directed to this feature of the fastener, and consequently, the base 20 may be formed to suspend articles by other conventional means. As an example, the base member may be provided with threaded holes, so that objects may be suspended therefrom by way of screws (not shown). Similarly, the base member may be provided with other forms of projections, or with grooves, recesses or the like, for engagement with portions of articles to be hung. In addition, it is evident that the fastener, in accordance with the invention, may employ a base member in the form of a T-shaped clip, for example, for holding panelling to a hard wall. The invention may also be adapted for the attachment of, for example, highway signs to cement posts and base members in the form of letters and numbers for attachment to buildings.

The fastener, as illustrated in FIG. 3, is provided with one or more holes 24 extending therethrough, from the wall engaging surface 21. In this embodiment of the invention, the holes 24 extend normal to the wall-engaging surface 21. A bushing 25 is assembled in each hole 24. As illustrated in FIGS. 1 and 3, the major portions of the bushings 25 extend outwardly from the surface 26 of the base 20 opposite the surface 21. Thus, only a small end portion 27 of the bushings extends into the apertures 24. The transverse dimensions of the bushings 25 are preferably very slightly larger than the transverse dimensions of the holes 24 into which they are assembled, so that the bushings 25 fit tightly in their respective apertures, but may be driven further into the apertures as will be discussed in the following paragraphs. It is also preferred that the bushings 25 and holes 24 have circular cross sections, although this shape is not absolutely necessary, as long as the bushings tightly fit their respective apertures both prior to use of the hard wall fastener, as illustrated in FIG. 3, and when the fastener is affixed to a wall, as illustrated in FIG. 2. In addition, as noted in FIG. 2, the bushings have axial lengths substantially equal to the thickness of the base 20, in the regions of the apertures.

Each bushing is provided with a central hole extending longitudinally thereto, in which a hardened steel pin 28 is assembled. The pins are assembled with pointed ends 29 directed toward the surface 21, and preferably blunted other ends 30 extending slightly beyond the outer ends of the bushings 25. It is preferred that the pins extend beyond the outer ends of the bushings 25, in order that the pins be of greater length, so that they can be driven further into the wall. If desired, of course, the blunt ends of the pins may alternatively be flush with the outer ends of the bushings, if so desired. Further, if desired, the blunt ends of the pins may be provided with heads. Thus, as illustrated in FIG. 3, the pointed ends 29 of the pins 28 are initially positioned in the portion of the aperture between the end 27 of the bushings 25 and the wall-engaging surface 21. The pins 28 are substantially longer than the bushings 25, as is clearly apparent in FIG. 2, in order that a sufficient portion of the pins may be driven into a wall in order to firmly affix the fastener to a wall. For example, the pins may have lengths of about 3/16 to 5/16 of an inch greater than the thickness of the base 20. The length selected for the pins depends, of course, upon the type of material of the wall.

In order to fix the hard wall fastener to a wall, the fastener, with projecting bushings and pins, as illustrated in FIGS. 1 and 3, is placed with its wall-engaging surface 21 against a wall. Then the blunt ends 30 of the pins are struck, for example with a hammer, to drive the pins into the wall, and also to force the bushings completely into the holes 24, as illustrated in FIG. 2. The initial force on the pins 30 effects the driving of the pointed end 29 of the pin into the wall without movement of the bushing, since the bushing is held in the base member 20 more tightly than the pin is held in the bushing. The bushing, however, serves to guide the pin directly into the wall during this initial step of installation. Since the pin is hardened, it will not be substantially deflected once the sharpened end thereof engages the wall, and since the back end of the pin is firmly and slidingly held in the bushing, the bushing inhibits deflection of the driving end of the pin. When the pin is driven into the wall at sufficient distance that the hammer engages the end of the bushing, the bushing will be forced into the hole in the base, as the pin is driven further into the wall. The bushing is thereby guided in its movement into the hole in the base. Since the bushing has substantially the same length as the thickness of the base, the end of the bushing, and hence also the end of the pin, will be substantially flush with the outer surface of the base when the pin is driven as far as possible into the wall.

It is to be noted that satisfactory guiding of a hardened pin, for forcing the pin into a hard wall, requires a support of the pin at each of its ends. Since the bushing guides the pin at its driving end, and the sharpened end of the pin engages the wall, the arrangement, in accordance with the invention, produces satisfactory guiding of the pin. It is to be noted that, if the pin were merely to extend into a hole in the base, without the use of the bushing, the driving end of the pin would not be supported during the initial stages of driving the pin into the wall. It has been found that such an arrangement thus does not provide suitable guiding for the pin, when the pin is of a sufficient hardness that it will not be substantially deformed as it passes into the wall. Further, if the bushing, in accordance with the invention, is not employed, it is not readily possible to employ an extremely hard pin, since in the absence of firm guiding for the end of the pin, the pin may shatter due to its brittleness, and personal injury may thereby result. The effectiveness of the guiding of the pin is apparent, since as will be discussed in the following paragraphs, it is not necessary that the fastener be designed to guide the pin in a direction perpendicular to the wall.

As discussed above, in order to obtain the advantages of a non-deformable pin that may be driven further into a wall, it is necessary to employ a very hard pin. In the past, pins were generally employed having hardnesses of, for example, 40 to 50 on the Rockwell C Scale. In the fastener of the present invention, however, pins are employed having hardnesses of about 46 to 50 on the Rockwell C Scale, such as case-hardened high-carbon steel or through-hardened tool steel. Carborundum may also be employed. As an example, it is preferred to provide a case-hardened pin of high-carbon steel having a hardness of 48 on the Rockwell C Scale. Such pins may be driven sufficiently into a wall that even a single pin may be used in a fastener, and also so that a multiplicity of pins in a single line may also be employed. It is preferred, of course, that more than one pin be provided for extra holding power, in order to avoid dependence upon a single pin. As an example of the hardness of the pin employed, it has been found that, employing the fastener of the invention, the pin of the fastener may be driven into a coin, such as a penny. With such hardness of the pins, as above discussed, it is necessary that the pins be firmly guided, in accordance with the invention, in order to avoid shattering, and the arrangement of the invention thus substantially completely encapsulates the pin to provide satisfactory guiding thereof, as well as to avoid any personal injury in the event that the pin does shatter, for example as as result of striking of the pin at too great an angle. The pin, in the fastener of the invention, can be struck at a small angle to its axis without danger, and in order to insure guiding of the pin when the pin is struck off axis, the end of the bushing within the base may be chamfered, as illustrated in FIGS. 3 – 5.

While, as above discussed, it is preferable that the pins have hardnesses of about 40 to 50 on the Rockwell C scale, if the fastener is to be employed on walls that are softer than concrete, such as on cinderblock walls, the pins may be provided with a hardness of 40 Rockwell C, or less.

The base and bushing of the fastener of FIG. 1, and also in the following disclosed embodiments of the invention, are preferably formed of a die casting metal. While, in the arrangement of FIGS. 1 – 3, the bushings and basemember may be separately cast, and then assembled, it has been found more economical to initially die cast one of the members, for example the base, and then die cast the other of the members, such as the bushings, employing the first die cast member as a portion of the die, whereby the bushings and die are formed in the relationship illustrated in FIGS. 1 and 3 and no further assembly of these components is necessary. The hardened steel pins 28 are then inserted into the holes in the bushings. In this step of formation of the articles, it may be necessary to provide a back-up at the inner end of the bushings, so that they do not move with respect to the base as the pins are forced into position.

In a further embodiment of the invention, as illustrated in FIG. 4, the bushings 35 are formed integrally with the base 36 in a single casting step, the configuration of these elements being otherwise the same as above described with reference to FIGS. 1 and 3. In this arrangement, a thin frangible cross section region 37 of the common material connects the base to the bushing, this cross section region being sufficiently small that it is broken by the blows of a hammer on the extending end of the bushing, during mounting of the fastener.

In a still further embodiment of the invention, as illustrated in FIG. 5, the apertures 24 extend through the base 20 at an angle to the wall-engaging surface 21. Thus, when the fastener is formed as a wall hook, as illustrated in FIG. 5, the holes 24 extend downwardly, so that the pins 28 will more firmly hold the fastener to the wall for supporting an object. Aside from this distinction, the fastener of FIG. 5 is the same as either that of FIGS. 1 and 3, or FIG. 4. It will be further apparent that, in a fastener in accordance with the invention, several bushings and their associated pins may be provided extending at different angles in the base member, in order to more firmly hold the fastener to a wall. For example, the pins and bushings may extend at angles toward each other with respect to the normal to the wall-engaging surface of the base member, in order to obtain a "harpoon" action as the pins are driven into the wall.

In a still further embodiment of the invention, as illustrated in FIGS. 6 and 7, the base 40 is formed generally in the same manner as the base 20 of the fastener of FIGS. 1 and 3, but in the arrangement of FIGS. 6 and 7 the hole 41 extending through the base 40 from the wall-engaging surface 42 is provided with a radially inwardly extending flange 43 at the surface 44 opposite the wall-engaging surface 42. The bushing 45 has, on the end 46 thereof within the hole 41, a radially outwardly extending flange 47 of a diameter that produces a tight fit against the walls of the hole 41 spaced from the inwardly extending flange 43. The remainder of the bushing 45 has a diameter that results in a tight fit with the inwardly extending flange 43. As illustrated in FIG. 6, the fastener is assembled or formed with the inner edge of the flange 43 engaging the edge of the flange 47 toward the surface 44. As in the previously described arrangements, a hardened steel pin 48 is assembled in the hole in the bushing.

When the fastener of FIG. 6 is affixed to a wall 49, as illustrated in FIG. 7, the pin 48 is driven into the wall, and the bushing 45 is driven into the hole 41 to guide the pin 49, so that the ends of the bushing and pin are substantially flush with the surface 44 of the base 43. In this arrangement, it is apparent that the outwardly extending flange 47 is guided in the larger diameter end of the hole 41, while the inwardly extending flange 43 guides the lesser diameter portion of the bushing 45. The arrangement of FIGS. 6 and 7 provides the advantage that it reduces the danger of accidental removal of the bushing from the hole 41, as well as misalignment of the bushing in the wall, which may result, for example, from striking the pin and bushing with a hammer at too great an angle with respect to the axis of the hole.

While the bushing and base assembly of FIGS. 5 and 6 may be formed by the techniques described above with reference to FIGS. 1 and 3, it has been found particularly advantageous to modify the casting technique for forming this embodiment of the invention. Thus, as illustrated in FIG. 8, the bushings 45 are initially die cast with the flanges 47 thereon, the bushings being joined by a gate portion 50. Further gate portions 51 may extend separately from each of the bushings. Preferably, the gate portions are joined to the parameter of the flanges 47. This technique is, of course, readily adaptable to die casting, since gates must be provided for directing the flow of die casting metal to the die cavities. In the arrangement illustrated in FIG. 8, the bushings 45 are thus simultaneously cast, and joined by the gates.

Following the formation of the interconnected bushings, as illustrated in FIG. 8, the interconnected assembly, including the gate portions, is assembled in a second die cavity for the die casting of the base. The die cavity for the formation of the base thus has suitable recesses for the portions of the bushings which are not connected to the base, as well as for the portions of the gates which extend beyond the outer boundaries of the base. The base is then cast around the interconnected bushings and gates, as illustrated in FIG. 9. It will be noted from FIG. 9 that the gate portion 50 thus becomes completely buried or trapped within the body of the base, and also the portions of the gates 51 adjoining the flanges 47 are also buried within the body of the base 40. This arrangement provides the advantageous feature, that the gate portions 50 and 51 constitute frangible supports for holding the bushings in place in the holes 41 of the base until the fastener is to be affixed to a wall. Following the die casting of the base 40, the pins are inserted in the central holes of the bushings, as illustrated at the left of FIG. 9. The pins may be assembled by forcing them by conventional techniques into the holes of the bushings, preferably with the pointed ends of the pins forming the leading edges thereof, and suitable backing is provided during this operation to prevent the breaking of the gates from the bushing flanges 47.

In addition to forming the frangible interconnection between the bushings and the base, the gate portions 51 may also serve as convenient means for grasping and holding the interconnected bushings during the process of transfer to the die for formation of the base. Following the formation of the base, the ends of the gates 51 extending from the base 40 are severed in accordance with conventional practice, although these portions of the gates may also serve for transporting the combined base-bushing structure to further work stations prior to their removal.

In the arrangements in accordance with the invention, either one or a plurality of bushing-pin assemblies may be provided in the base member. Since the fasteners, in accordance with the invention, are generally relatively small, it is preferred that the pins be spaced apart at a sufficiently small distance that they may be simultaneously struck by the head of a conventional hammer. If a larger fastener is employed, it is further preferred that groups of the pins be provided in spaced-apart positions, with the spacings between the pins of any group being sufficiently small that all of the pins of a given group may be struck simultaneously. In some larger fasteners, for example, a fastener of the type illustrated in FIG. 14, it may, of course, be desirable to space the pins apart sufficiently that the pins may be easily struck separately by a hammer. Such larger spacing of the pins is particularly desirable, for example, if the surface into which the pins are to be driven is very hard, whereby a greater force is necessary for driving the pin into the wall. It is further desired that the force required for forcing the bushings associated with each pin into their respective holes be substantially the same for each bushing. When a fastener of the type illustrated in FIGS. 6 and 7 is employed, formed with a buried gate, this result may be obtained by forming the gates of such dimensions that the total cross-sectional area of all of the gates at any bushing is the same for all bushings of the group. Thus, as illustrated in FIG. 10, wherein two bushing-pin combinations are provided, a common gate portion 50 is joined to the two bushings 45, and a separate gate portion 51 is joined to each of the bushings 45 and leads to the periphery of the base. The sum of the cross-sectional area of the gates 50 and 51 at each bushing are the same, so that substantially the same force will be required to break the frangible gates at each bushing.

Figure 11:
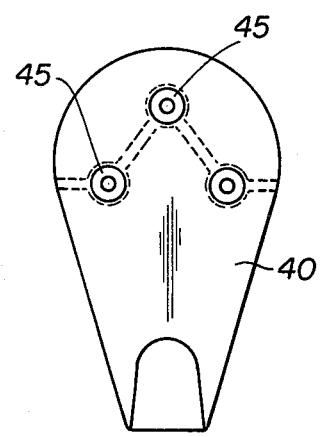
FIG. 11 is a simplified plan view of a hard-wall fastener in accordance with the invention, incorporating three pins.
Figure 12:
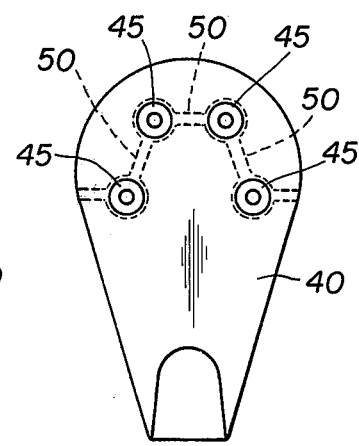
FIG. 12 is a simplified plan view of a hard-wall fastener in accordance with the invention, incorporating four pins.

When a larger number of pin-bushing combinations is provided, the requirement that the sum of the cross-sectional areas of the gates at each bushing be the same may be simply achieved, as illustrated in FIGS. 11 and 12, by directing the die casting metal, in the formation of the bushings, so that each of the bushings is connected to an adjacent bushing on either side by way of a gate 50. While the bushings and gates are illustrated serially connected in FIGS. 11 and 12, it will be apparent that other arrangements for interconnecting the bushings with gates may be employed. In addition, if necessary, the desired cross-sectional area of the frangible joints may be controlled by proper selection of the dimensions of the gates in order to insure that the cross-sectional areas of the joints at each bushing are the same.

While the process illustrated in the FIGS. 8 and 9 is not specifically explained with respect to the formation of the flanged bushings of FIGS. 6 and 7, it will be apparent that this technique is also applicable to the formation of unflanged bushings, for example of the type illustrated in FIGS. 1 – 3.

Figures 13, 14, 15:
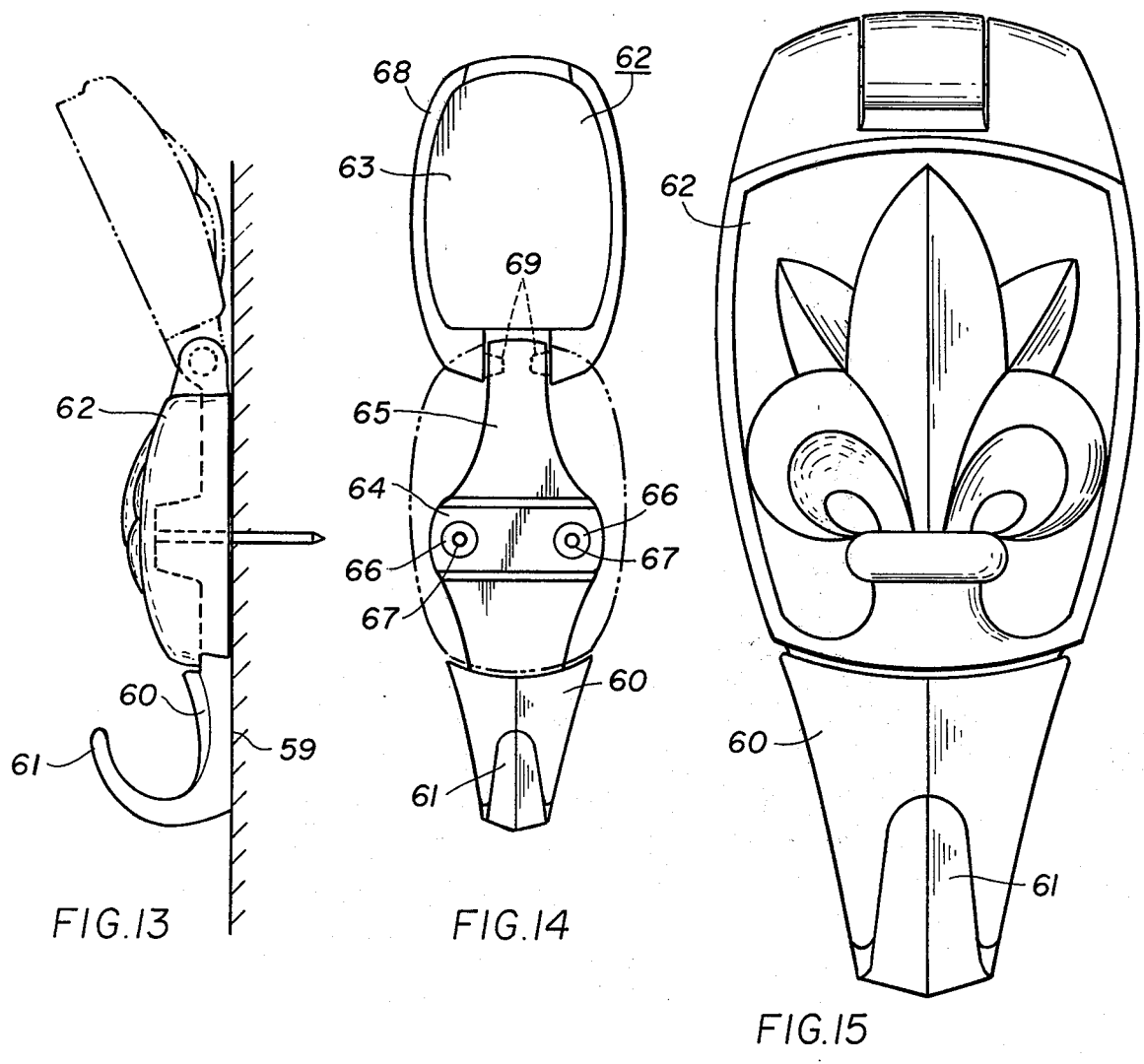
FIG. 13 is a side view of a hard-wall fastener in accordance with a further embodiment of the invention, incorporating a hinged cover.
FIG. 14 is a plan view of the hard-wall fastener of FIG. 13, with the hinged cover in open position.
FIG. 15 is an enlarged plan view of the hard-wall fastener of FIGS. 13 and 14, illustrating the hinged cover in closed position.

In a further modification of the invention, as illustrated in FIGS. 13 and 15, the fastener may be provided with a cover, such as a decorative cover, in order to conceal the bushings and pins once the fastener has been affixed to a wall. In this arrangement, the base 60 is provided with a hook 61 or other configuration for suspending an article, at its lower end. A cover 62 is hinged to the base at the upper portion thereof, so that the cover may be swung down to conceal the upper portion of the base. Thus, FIG. 13 illustrates the cover 62 in its lowermost position, concealing the base, in solid lines, with the upper position of the cover 62 being shown in dashed lines. FIG. 14 illustrates the cover 62 in its open position, while FIG. 15 illustrates the cover 62 in its lower position. The cover 62 may be formed with a central cavity 63 adapted to completely cover the upper portion of the base. The upper portion of the base is provided with a boss 64 extending from the surface 65 away from the wall-engaging surface 66, the boss 64 having suitable dimensions for retaining the desired number of bushings 66 and pins 67 of the above-described type. Preferably, the upper portion of the base has peripheral dimensions smaller than that of the cover 62, so that a skirt 68 on the cover 62, which in part defines the cavity 63, may extend into contact with the wall upon which the fastener is affixed, so that the sides of the base and the boss thereon are completely concealed as shown in FIG. 13.

The hinged joint between the base 60 and the cover 62 may be in the form of a pair of tapered recesses in opposite sides of the upper end of the base, into which tapered projections 69 of the cover 62 extend, as more clearly illustrated in FIG. 14.

In a convenient method for the formation of the fastener of FIGS. 13 – 15, one of the base 60 or cover 62 may be first formed, for example by die casting, and the second of the members then being die cast employing the hinge region of the first-cast member as a portion of the die. This technique enables the rapid and economical manufacture of the fastener, while also enabling the provision of any ornamental features on the fastener, such as the pattern illustrated on the cover 62 in FIG. 15.

In a particularly suitable method for the formation of the fastener of FIGS. 13 – 15, the cover 62 and the bushings 66 may be simultaneously cast, with suitable gates interconnecting the bushings in the technique described with reference to FIGS. 8 and 9, and gates interconnecting the bushings with the cover. The thus cast structure is then moved to a further die for the formation of the base member, wherein the die casting metal is flowed around the gates interconnecting the bushings, as described with reference to FIGS. 8 and 9, and also to flow around the hinge portions of the cover to form the hinge joint between the base and the cover. Thus, the base, bushings and cover may be formed in a two-step casting process. The gates are, of course, subsequently severed from the structure, and the pins inserted in their respective bushing.

In order to affix the fastener of FIGS. 13 – 15 to a wall, the cover 62 is placed in its upper position to a wall, the cover 62 is placed in its upper position, with the base held against a wall, and then the pins and bushings are driven in, as above described. Following this, the cover 62 is pivoted to its lower position, as illustrated in FIG. 15, to cover the upper portion of the base and the bushings and pins.

Figure 16:
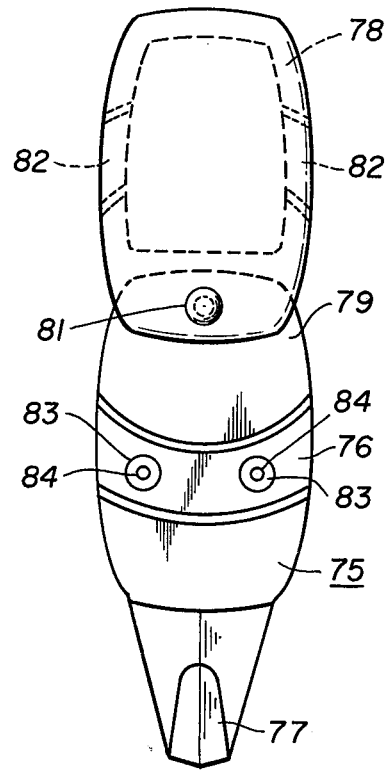
FIG. 16 is a plan view of a hard-wall fastener in accordance with a further embodiment of the invention, employing a swivelable cover.
Figure 17:
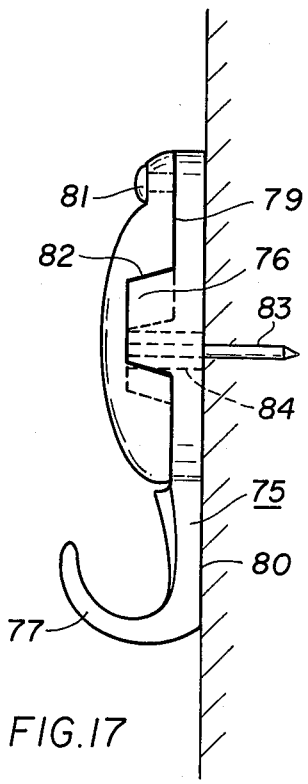
FIG. 17 is a side view of the fastener of FIG. 16.

In a still further embodiment of the invention, as illustrated in FIGS. 16 and 17, the hard-wall fastener is provided with a base 75 having a boss 76 extending thereacross and a lower hook 77, as in the arrangement of FIGS. 13 – 15. In the fastener illustrated in FIGS. 16 and 17, however, the cover 78 is pivotably affixed to the surface 79 of the base, opposite the wall mounting surface 80, and a pivot 81 having an axis extending normal to the wall mounting surface 80, so that the cover 78 may be swivelled about the axis 81 to cover the boss 76. In this arrangement, it is apparent that the outer periphery of the base at the upper portion thereof and the ends of the boss 76 form the external sides of the fastener, and that the boss 76 is preferably arcuate so that the grooves 82 in the skirts of the cover 78 may freely slide over the boss to be aligned with the upper portion of the base, thereby to cover the ends of the bushings 83 and pins 84 after the fastener has been affixed to a wall, as illustrated in FIG. 17.

The fastener of FIGS. 16 and 17 may be formed by a process similar to that above described with reference to FIGS. 13 – 15. Thus, the cover 78 and an assembly of bushings 84 and gates interconnecting the bushings may be simultaneously cast, with the cover 78 having a hole for forming a pivot joint. Subsequently, the base is cast around the gates interconnecting the bushings, as well as in the hole formed in the cover 78, whereby the base, bushings and cover are completely formed in two casting steps. The pins 83 may then be separately installed in the bushings as above described.

In a further embodiment of the invention, the fasteners of the type illustrated in FIGS. 13 – 17 may be provided without the use of the guide bushings, in which case the pins extend directly to holes of suitable size in the base members. When such fasteners are mounted on a wall, the pins are driven in sufficiently that the covers may be hinged into place to cover the ends of the pins, as discussed above.

Further, as discussed above, it is preferred that the base members and bushings be formed of a metallic material. Alternatively, of course, especially for use under corrosive conditions, the base members and bushings may be formed of hard epoxy resin, plastic or glass-reinforced plastic (thermoplastic or thermoset material). In this case, it is, of course, advantageous to provide pins of stainless steel.

While the invention has been disclosed with reference to a limited number of embodiments, it will be apparent that variations and modifications may be made therein, and it is intended in the following claims to cover each such variation and modification as falls within the true spirit and scope of the invention.

What is claimed is:

1. A method for producing an article having a first element releasably held in a second element, comprising forming said first element of a die casting metal with a portion to be releasably held and at least one gate portion joining said portion to be releasably held, and then forming said second element by die casting a die casting metal to substantially bury said gate portion in said second element.

2. A method for producing an article having a plurality of first elements releasably held in apertures in a second element, comprising die casting said first element with interconnecting gates, with the total cross sectional area of gates at each first element being substantially the same, providing a die having a die cavity corresponding substantially to said article, inserting said first elements with said interconnecting gates attached thereto in said die cavity, and then flowing a die casting metal to fill the remaining space of said die cavity, whereby said gates become substantially completely buried in said second element and releasably hold said first elements in said apertures of said second element.

3. The method of claim 2 wherein said gates have portions which extend beyond the outer surface of said second element, wherein said step of inserting said first elements in said die comprises transporting and supporting said first elements in said die by means of said gates, and further comprising removing said first and second elements from said die cavity following the flowing of a die casting metal therein, and then trimming said gate portions from said gates.

4. A method for producing an article having a first element held in an aperture in a second element and adapted to be released therefrom by the application of a force in a direction to urge said first element through said aperture, comprising forming a unitary element including said first element and a gate portion extending from the sides of said unitary element, with the gate portion having a cross section at the juncture with said first element that is symmetrically distributed about said first element, then casting said second element to substantially bury said gate portion to form said aperture with sides that are substantially equally spaced from the sides of said first element.

5. The method of claim 4 wherein said step of forming comprises forming said first element with a circular cross section, and said step of casting comprises casting said second element with said aperture having a circular cross section and coaxial with said first element.

6. The method of claim 4 wherein said step of casting comprises casting said second element of the same material as said unitary element.

7. The method of claim 6 in which said unitary element is formed of a die casting metal, wherein said step of casting comprises die casting said second element of a die casting metal.

8. The method of claim 4 wherein said step of casting said second element to substantially bury said gate portion comprises leaving an end of said gate portion away from said aperture unburied in said second element.

9. The method of claim 8 in which said step of forming said unitary element comprises casting said unitary element in a first mold cavity, and said step of casting said second element comprises casting said second element in a second mold cavity, the step of transferring said unitary element from said mold cavity to said second mold cavity by said gate portion.

10. The method of claim 9 further comprising transporting said combined first and unitary elements from said second mold cavity by grasping said end of said gate portion.

11. A method for producing an article having a first element held in an aperture in a second element and adapted to be released therefrom by the application of a force in a direction to urge said first element to said aperture, comprising forming a unitary element including said first element and a gate portion including a plurality of gates of equal cross section extending symmetrically from the sides of said first element, then casting said second element to substantially bury said gate portion to form said aperture with sides that are substantially equally spaced from the sides of said first element.

12. The method of claim 11 wherein said step of forming said unitary element comprising forming said first element with a circular cross section, and said step of casting said second element comprises casting said second element with said aperture held in a circular cross section coaxial with said first element.

13. The method of claim 12 wherein said step of forming said unitary element comprises forming said gate portion with two gates extending from opposite sides of said first element and having equal cross sections at the junctures thereof with said first element.

14. The method of claim 11 wherein said step of casting said second element comprises casting said second element of the same material as said unitary element.

15. The method of claim 14 wherein said unitary element is formed of a die casting metal, and wherein said step of casting comprises die casting said second element of a die casting material.

16. The method of claim 14 wherein said step of casting said second element comprises casting said second element of a resin.

17. The method of claim 14 wherein said step of casting comprises casting said second element of a plastic material.

18. The method of claim 11 wherein said step of casting comprises casting said second element with the ends of said gates away from said aperture exposed.

19. The method of claim 18 wherein said step of forming said unitary element comprises casting said unitary element in a first mold cavity, and said step of casting said second element comprises casting said second element in a second mold cavity, and further comprising transporting said unitary element formed in said first mold cavity to said second mold cavity by grasping said ends of said gates.

20. The method of claim 19 further comprising severing said ends from said gates following said casting of said second element.

21. The method of claim 6 wherein said step of casting comprises casting said second element of a resin material.

22. The method of claim 6 wherein said step of casting said second element comprises casting said second element of a plastic material.

* * * * *